United States Patent [19]

Masclet et al.

[11] 4,380,323

[45] Apr. 19, 1983

[54] MAIN UNDERCARRIAGE TRAIN FOR AN AIRCRAFT

[75] Inventors: Jean Masclet, Paris; Andre Turiot, Morsang sur Orge, both of France

[73] Assignee: Messier-Hispano-Bugatti, Montrouge, France

[21] Appl. No.: 205,174

[22] Filed: Nov. 10, 1980

Related U.S. Application Data

[63] Continuation of Ser. No. 969,173, Dec. 13, 1978, abandoned.

[30] Foreign Application Priority Data

Feb. 2, 1978 [FR] France ................. 78 00016

[51] Int. Cl.³ .................. B64C 25/00; B64C 25/10
[52] U.S. Cl. ................................... 244/102 R
[58] Field of Search ........... 244/100 B, 102 R, 102 A, 244/102 SS, 104 R, 103 R

[56] References Cited

U.S. PATENT DOCUMENTS

| | | | |
|---|---|---|---|
| 2,429,206 | 10/1947 | Lappin et al. | 244/102 R |
| 2,621,004 | 12/1952 | Ashton et al. | 244/102 R |
| 2,960,287 | 11/1960 | Barlow | 244/102 R |
| 3,038,687 | 6/1962 | Hartel | 244/102 R |

FOREIGN PATENT DOCUMENTS

1102080 2/1968 United Kingdom ........... 244/102 R

Primary Examiner—Charles E. Frankfort
Attorney, Agent, or Firm—McAulay, Fields, Fisher, Goldstein & Nissen

[57] ABSTRACT

A main undercarriage train for an aircraft which is retractable substantially laterally, the train comprising two undercarriages which comprise identical legs each having a plane of symmetry which passes through its pivot mounting axis which is inclined relative to the plane of symmetry of the aircraft. Each undercarriage further comprises a bush capable of being retained in either of two positions in a bore of the undercarriage leg or a wheel-carrying member and the internal bore of which, through which internal bore passes a shaft on which an assembly for alignment of the wheels are pivoted, has its axis off-set with respect to the axis of the bore in which the bush is retained, and compensates for the angular displacement between the plane of symmetry of the aircraft and the inclined axis of the one or the other undercarriage leg, depending on whether the bush is retained in a first of the two positions or in a second of the two positions which is obtained from the first of the two positions by rotating the bush through 180° about the axis of its bore, whereby the left and right undercarriages are totally interchangeable.

15 Claims, 18 Drawing Figures

FIG. 18

MAIN UNDERCARRIAGE TRAIN FOR AN AIRCRAFT

This is a continuation, of application Ser. No. 969,173 filed Dec. 13, 1978, now abandoned.

The invention relates to aircraft undercarriage trains and particularly to main undercarriage trains which are retracted substantially laterally.

Many forms of main undercarriage trains have been previously proposed, which comprise two undercarriages arranged symmetrically on respective sides of the longitudinal plane of symmetry of the aircraft. Each of the undercarriages comprises a leg which is pivotally mounted on the aircraft and which supports a member carrying one or more wheels, which is associated with damping means and with alignment means, the purpose of which is to keep the plane of the wheels parallel to the longitudinal plane of symmetry of the aircraft, in the "undercarriage down" position, the damping means and the wheel-carrying member on one of the legs being generally identical to these components on the other leg.

In the case of main undercarriage trains which are retracted laterally, that is to say, in which the centre of the wheels carried by the undercarriages is displaced, both in the retraction movement and in the downward extension movement of the undercarriage, in a plane which is perpendicular to the longitudinal axis of the aircraft, the axes about which the undercarriage legs are pivotal with respect to the aircraft are disposed in a plane which is parallel to the longitudinal plane of symmetry of the aircraft. It is then easy to construct the undercarriage train by using two identical and therefore interchangeable undercarriages since a right-hand undercarriage, or any part thereof, can be mounted at the position of a left-hand undercarriage, or any corresponding part thereof, and vice-versa.

In contrast, in main undercarriage trains which are retracted substantially laterally, that is to say, in which, upon retraction, the centre of the wheels of the undercarriages do not remain in a plane which is perpendicular to the longitudinal axis of the aircraft and which passes through the centre of the wheels in the "undercarriage down" position, the axes about which the undercarriage legs are pivoted on the aircraft are inclined symmetrically with respect to the plane of symmetry of the aircraft. For this reason, the leg of the right-hand undercarriage is different in structure to the leg of the left-hand undercarriage, and the undercarriages are therefore not interchangeable. This causes greater expense not only in manufacturing the undercarriage legs, which must be of two kinds, but also in maintaining aircraft which are provided with such undercarriage trains since both left and right-hand spare legs must be kept ready for use.

According to the invention there is provided a main undercarriage train for an aircraft, of the kind comprising two undercarriages which are retractable substantially laterally and which are disposed symmetrically on respective sides of the longitudinal plane of symmetry of the aircraft, each undercarriage comprising a leg which supports a member carrying one or more wheels with the axes of the pivot mountings of the undercarriage legs on the aircraft symmetrically inclined with respect to said longitudinal plane; damping means and alignment means associated with each said member for keeping the plane of the wheels parallel to the longitudinal plane of symmetry of the aircraft in the "undercarriage down" position with the leg, the damping means and the wheel-carrying member on one of the undercarriages being identical to those of the other undercarriage; each undercarriage leg having a plane of symmetry which passes through its axis of pivot mounting on the aircraft, and each undercarriage including a bush which can be retained in either of two positions in a bore in the undercarriage leg thereof or in the wheel-carrying member thereof with the axis of the internal bore of the bush, through which internal bore passes a shaft on which the alignment means are pivoted, off-set with respect to the axis of the bore in which the bush is retained, thereby to compensate for the angular displacement between the longitudinal plane of symmetry of the aircraft and the inclined pivot mounting axis of the one or the other undercarriage leg, depending on whether the bush is retained in a first of the two positions or in a second of the two positions, which second of the positions is obtained from the first of the positions by rotating the bush through 180° about the axis of its internal bore, the left-hand and right-hand undercarriages thus being totally interchangeable.

Thus the undercarriages can be interchangeable irrespective of whether they are of the "sliding" kind, that is to say the member which carries the one or more wheels comprises a rod which carries at least one wheel on its lower end and is received slidably, with damping, in the undercarriage leg, with alignment means comprising a caliper-like assembly having two arms which are pivotally connected together and of which the upper arm is pivotally mounted on the undercarriage leg and the lower arm is pivotally mounted on the rod, or whether the undercarriages are of the "pivoted link" kind, that is to say in the wheel-carrying member comprises a pivoted link which, simultaneously, is included in the alignment means, carries at least one wheel, is mounted pivotally on the lower part of the undercarriage leg, and carries the pivot mounting of a damper which is connected on the other hand to the undercarriage leg.

Indeed, taking a left-hand undercarriage, it is only necessary to change over the position of the bush member in order to form a right-hand undercarriage, as the angular displacement is then compensated symmetrically.

If the undercarriages are of the "sliding" kind, they may have upper and lower arms of one of the caliper-like assemblies, which are respectively identical to the upper and lower arms of the other caliper-like assembly, each upper arm being pivoted to an undercarriage leg symmetrically with respect to the plane of symmetry of the leg, and each lower arm being pivoted to the rod about a shaft the axis of which intersects the axis of the rod, which shaft passes through the internal bore in the bush, which bush is retained in a bore provided in the rod and the axis of which is perpendicular to the plane of symmetry of the aircraft in the "undercarriage down" position.

This thus provides interchangeable undercarriages in which the caliper-like assemblies may be simply transferred from one undercarriage to the other.

Alternatively undercarriages of the "sliding" kind, may have the two upper arms, identical with each other, and the two lower arms, identical with each other, of the two caliper-like assemblies having a plane of symmetry which passes through the axes of their pivotal connections, each upper arm being pivoted to a leg about a shaft whose axis, in the "undercarriage down" position, is perpendicular to the plane of symmetry of the aircraft and which passes through the internal bore of the bush, which is retained in a bore provided in the undercarriage leg and the axis of which is perpendicular to the plane of symmetry of the undercarriage leg, each lower arm being pivoted to the rod about an axis which, in the "undercarriage down" position, is perpendicular to the plane of symmetry of the aircraft, the upper and lower arms of each caliper-like assembly being pivotally connected together with a displacement which compensates for the lateral displacement between the pivotal connection to the undercarriage leg and the pivotal connection to the rod, in such a way that the caliper-like assembly on one of the undercarriages can be used on the other undercarriage, after having been opened until it assumes a position which is symmetrical with respect to its initial position, relative to the position of alignment of the arms.

By having a plane of symmetry which passes through the axes of their pivot connections, the two upper arms and the two lower arms form two caliper-like assemblies which, while being identical, can be mounted symmetrically with respect to the plane of symmetry of the aircraft, in order to compensate for the lateral displacements, defined by the pivot connections of the caliper-like assemblies to the undercarriage legs and to the rods, which are reversed one with respect to the other.

If the undercarriages are of the "pivoted link" kind, a preferred embodiment comprises pivoting the pivoted link about a shaft the axis of which in the "undercarriage down" position is perpendicular to the plane of symmetry of the aircraft and which passes through the internal bore in the bush which is held in a bore the axis of which is perpendicular to the plane of symmetry of the undercarriage leg and which is provided in the lower part of the undercarriage leg, so that the pivoted link and the wheel or wheels carried thereby move in a plane which is parallel to the longitudinal plane of symmetry of the aircraft when the aircraft is moving along the ground.

The invention is diagrammatically illustrated by way of example in the accompanying drawings, in which.

Referring to FIGS. 1 to 8, an undercarriage train comprises a left-hand undercarriage 1 and a right-hand undercarriage 2, each of which comprises an undercarriage leg 3 which at its upper end is mounted by a pivot mounting 4 on an aircraft, and is of symmetrical structure relative to a plane passing through the axis of the pivot mounting 4.

Figure 1:
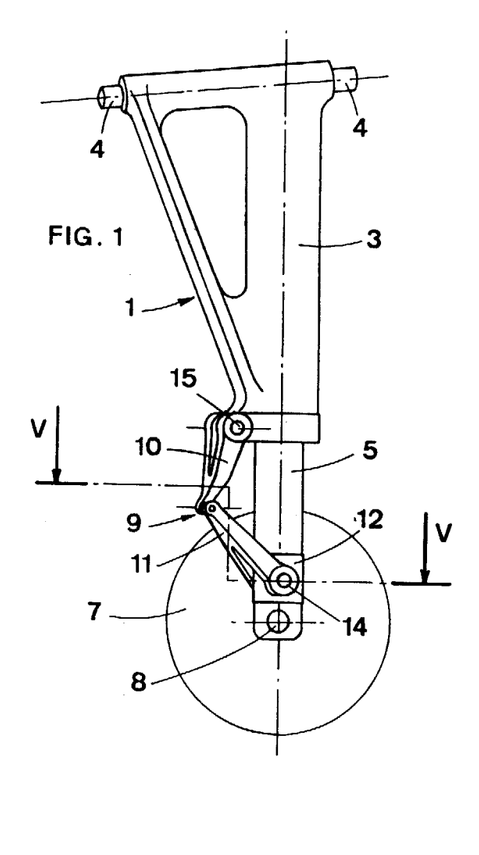
FIGS. 1 and 2 show respectively left-hand and right-hand undercarriages of a first embodiment of a main undercarriage train according to the invention of the "sliding" kind, which is retracted in a substantially lateral direction and which is a wing train for an aeroplane with swept-back wings, the wheels being displaced forwardly when the undercarriages are retracted so as to be housed in the fuselage of the aeroplane below the roots of the wings.
Figure 2:
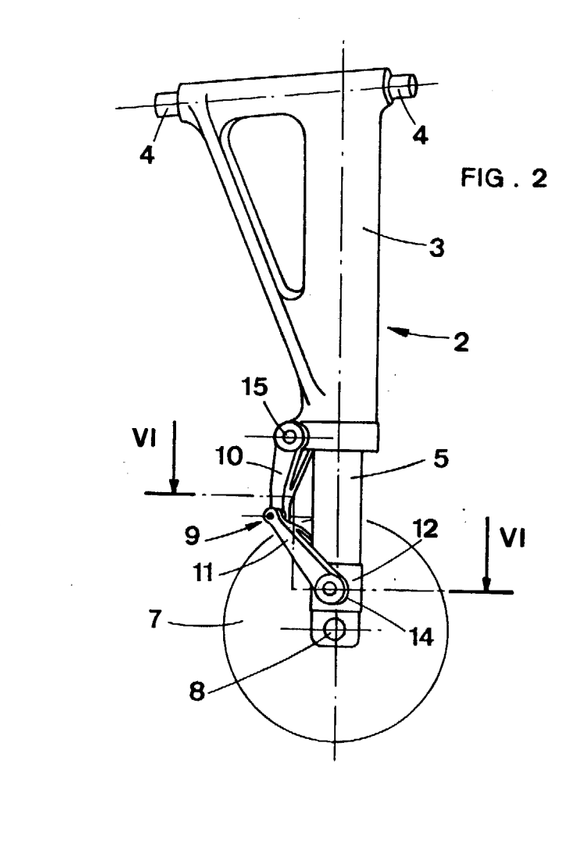
Figure 3:
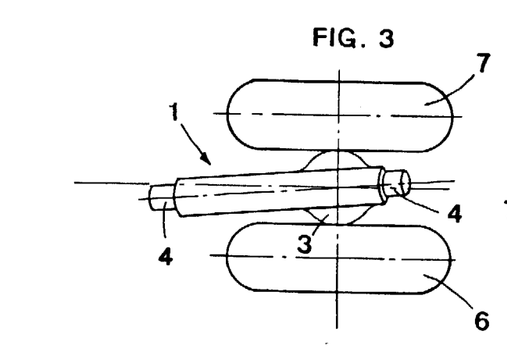
FIGS. 3 and 4 show respective plan views from above of the undercarriages shown in FIGS. 1 and 2.
Figure 4:
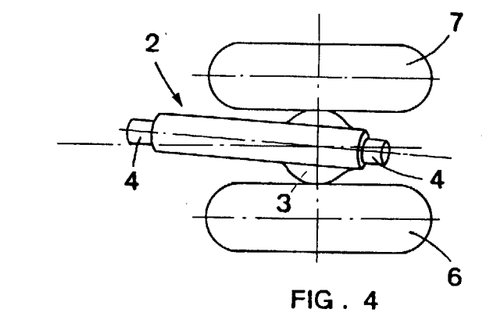

The undercarriage legs 3 are thus identical for both undercarriages 1 and 2. A rod 5 which at its lower part carries wheels 6 and 7 rotatable about an axle 8 is received slidably, with damping, within the undercarriage leg 3 which is in the form of a damper cylinder.

A caliper-like assembly comprising an upper arm 10 and a lower arm 11 which are pivotally connected together is pivoted by way of its upper arm 10 to the lower end of the undercarriage leg 3 and by way of its lower arm 11 to a collar 12 which is fixed with respect to the lower part of the rod 5, about an axis which intersects the axis of the rod 5. As the wheels 6 and 7 must be displaced towards the front of the aircraft during the retraction movement of the undercarriage, the axes of the pivot mountings 4 of the undercarriages 1 and 2 on the aircraft are disposed in an inclined position relative to the longitudinal plane of symmetry of the aircraft, as can be seen from FIGS. 3 and 4 which show the undercarriages 1 and 2 disposed symmetrically on respective sides of a line A—A representing the plane of symmetry of the aircraft, the front of which is indicated by the arrow. Accordingly, for each undercarriage, the axis of the pivot mounting 4 is inclined from the interior outwardly relative to the aircraft, viewing from the rear towards the front of the aircraft. Moreover, so that the wheels 6 and 7 are positioned flat in the "undercarriage up" position, the pivot mounting axes 4 are simultaneously inclined downwardly and forwardly of the aircraft, as shown in FIGS. 1 and 2. However, in the "undercarriage down" position of the aircraft, the plane of the wheels 6 and 7 must be constantly kept parallel to the plane of symmetry of the aircraft. The angular displacement between the plane of symmetry of the aircraft and the axes of the pivot mountings 4 is compensated by a bush member 13 which is retained in a bore which extends through the rod 5 and whose axis, in the "undercarriage down" position, is perpendicular to the plane of symmetry of the aircraft and intersects the axis of the rod 5. The bush member 13 has an internal bore the axis of which is off-set with respect to the axis of the bore in which the bush member 13 is retained, the angular displacement between the axis of the internal bore of the bush member 13 and the axis of the bore which accommodates the bush member 13 being equal to the angular displacement which is to be compensated.

Figure 5:
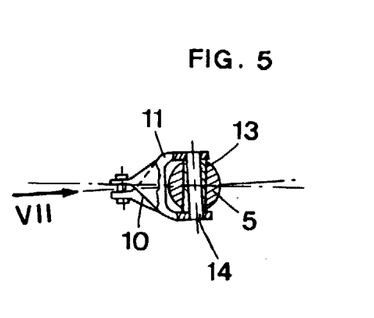
FIGS. 5 and 6 show respective views in section taken along lines V—V and VI—VI in FIGS. 1 and 2.
Figure 6:
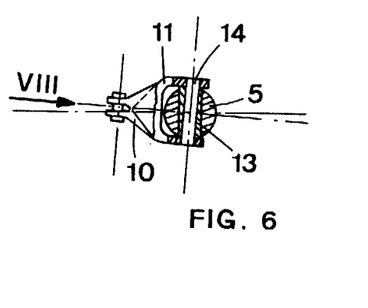

The bush member 13 is immobilised in the bore in the rod 5 in such a way that the axis of its internal bore is perpendicular to the plane of symmetry of the undercarriage leg 3 so that it is then sufficient for the lower arm 11 of the caliper-like assembly to be pivoted to the ends of a shaft 14 which passes through the internal bore in the bush member 13, and for the upper arm 10 of the caliper-like assembly 9 to be pivoted, symmetrically with respect to the plane of symmetry of the undercarriage leg 3, to the ends of a shaft 15 which is held on the undercarriage leg 3, in order for the wheels to be held in the correct position, when the leg 3 and the caliper-like assembly 9 are inclined. The bush member 13 is capable of assuming either of two determined positions in the bore in which it is disposed, each position corresponding to compensation for the angular displacement of one of the undercarriages, the bush member being movable from one position to the other, in order to compensate for the symmetrical angular displacement of the other undercarriage assembly, by a simple rotary movement of the bush member 13 through 180° about the axis of its internal bore, as is shown in FIGS. 5 and 6.

Figure 7:
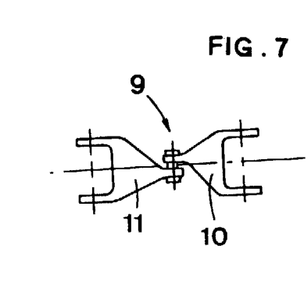
FIGS. 7 and 8 show respective views in the direction of arrows VII and VIII in FIGS. 5 and 6.
Figure 8:
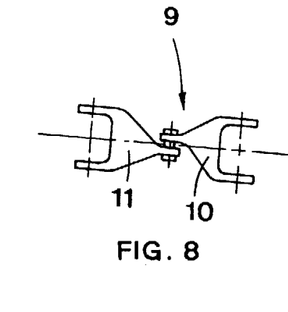

The left-hand undercarriage 1 and the right-hand undercarriage 2 are thus totally interchangeable: to fit one undercarriage in the position of the other, it is only necessary to change the bush member 13 from one determined position to the other. Likewise, each element of an undercarriage can be mounted on the other, by simple translation in respect of the caliper-like assemblies 9, if the upper and lower arms of one of the caliper-like assemblies 9 are respectively identical to the corresponding arms of the other assembly, as shown in FIGS. 7 and 8.

Figure 13:
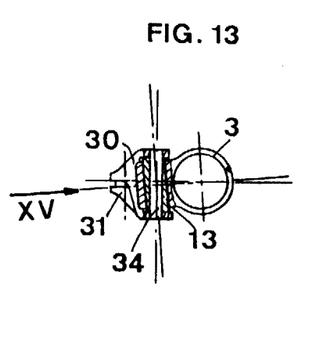
FIGS. 13 and 14 show respective views in section taken along lines XIII—XIII and XIV—XIV in FIGS. 9 and 10.
Figure 14:
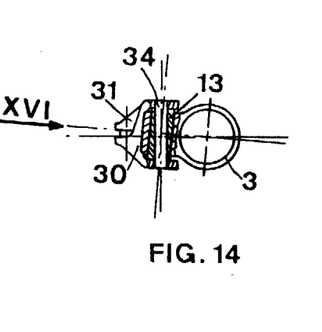

Referring now to FIGS. 9 to 16, a second embodiment of the undercarriage train of the "sliding" kind, comprises a left-hand undercarriage 21 and a right-hand undercarriage 22, each of which comprises the above-described undercarriage leg 3 which is mounted on the aircraft by a pivot mounting 4 whose axis is at the same angle of inclination, an identical rod 5 which carries the wheels 6 and 7 which are mounted rotatably about an axle 8 and which is received in the leg with damping, in the same manner. In contrast with the embodiment of FIGS. 1 to 8, in this embodiment two upper arms 30, which are identical to each other, and two lower arms 31, which are identical to each other, of caliper-like assemblies 29 have planes of symmetry BB and CC respectively, which pass through the axes of their pivot connections, and, as can be seen in FIGS. 13 and 14 and in greater detail in FIG. 17 for the left-hand undercarriage assembly, each upper arm 30 is pivoted to one of the undercarriage legs 3 about a shaft 34 which passes through the internal bore of a bush member 13 which is identical to that described above under reference 13, the axis of the internal bore in the bush member 13 being perpendicular to the plane of symmetry of the aircraft in the "undercarriage down" position, the bush member 13 being retained in a bore provided in the lower part of the undercarriage leg 3 and the axis of which is perpendicular to the plane of symmetry of the leg 3, while each lower arm 31 is pivoted about an axis 35 perpendicular to the plane of symmetry of the aircraft, on a collar 32 which is fixed with respect to the lower part of the rod 5.

Thus, compensation for the angular displacement of each undercarriage leg with respect to the plane of symmetry of the aircraft is effected at the pivotal mounting of each upper arm 30 of the caliper-like assembly 29 on the lower end of the undercarriage leg 3, the caliper-like assemblies 29 moving in planes which are parallel to the plane of symmetry of the aircraft.

Figure 9:
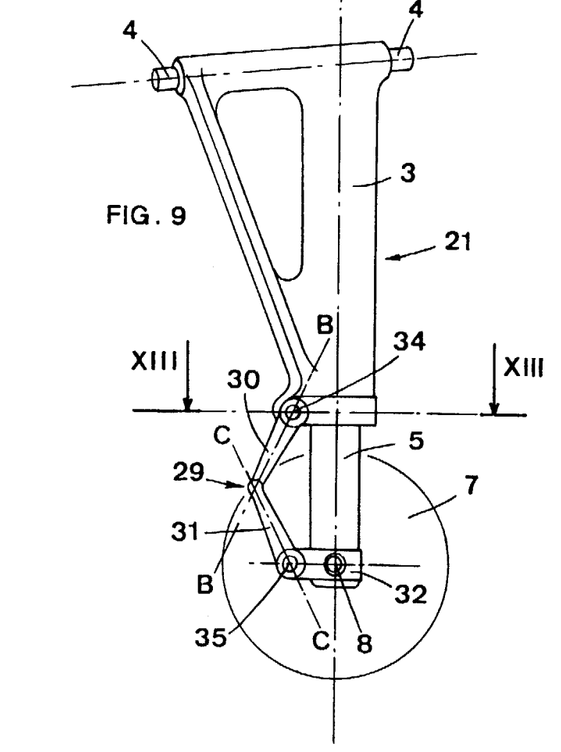
FIGS. 9 and 10 respectively show, in views similar to those of FIGS. 1 and 2, left-hand and right-hand undercarriages of a second embodiment of a main undercarriage train according to the invention also of the "sliding" kind.
Figure 10:
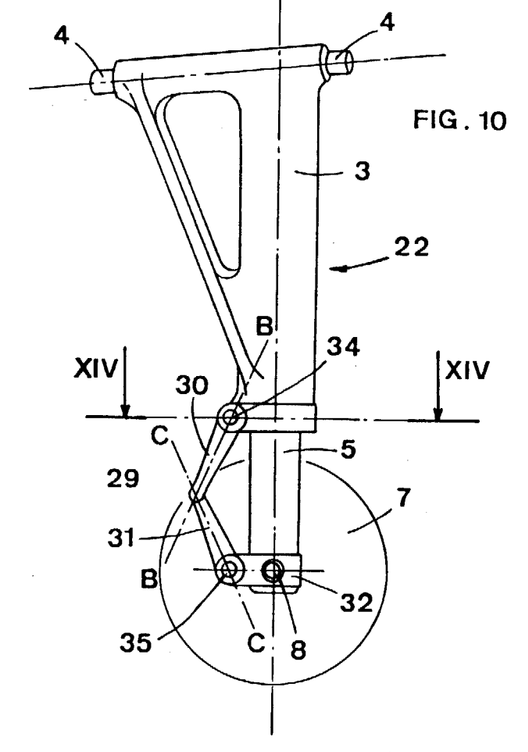
Figure 11:
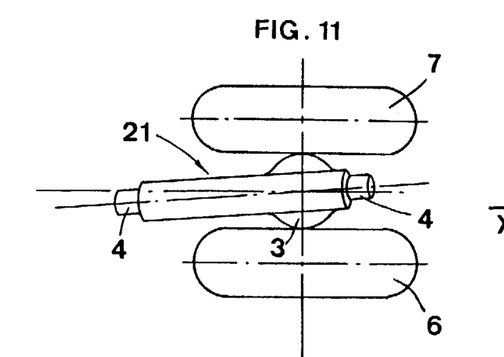
FIGS. 11 and 12 show respective plan views from above of the undercarriages shown in FIGS. 9 and 10.
Figure 12:
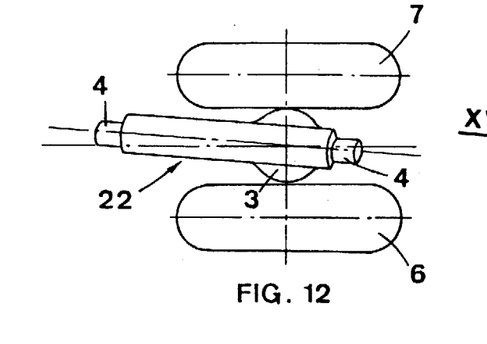
Figure 15:
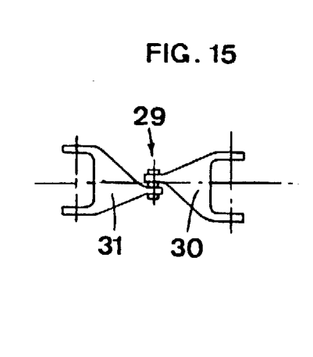
FIGS. 15 and 16 show respective views in the direction of arrows XV and XVI in FIGS. 13 and 14.
Figure 16:
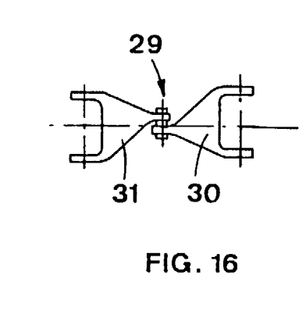
Figure 17:
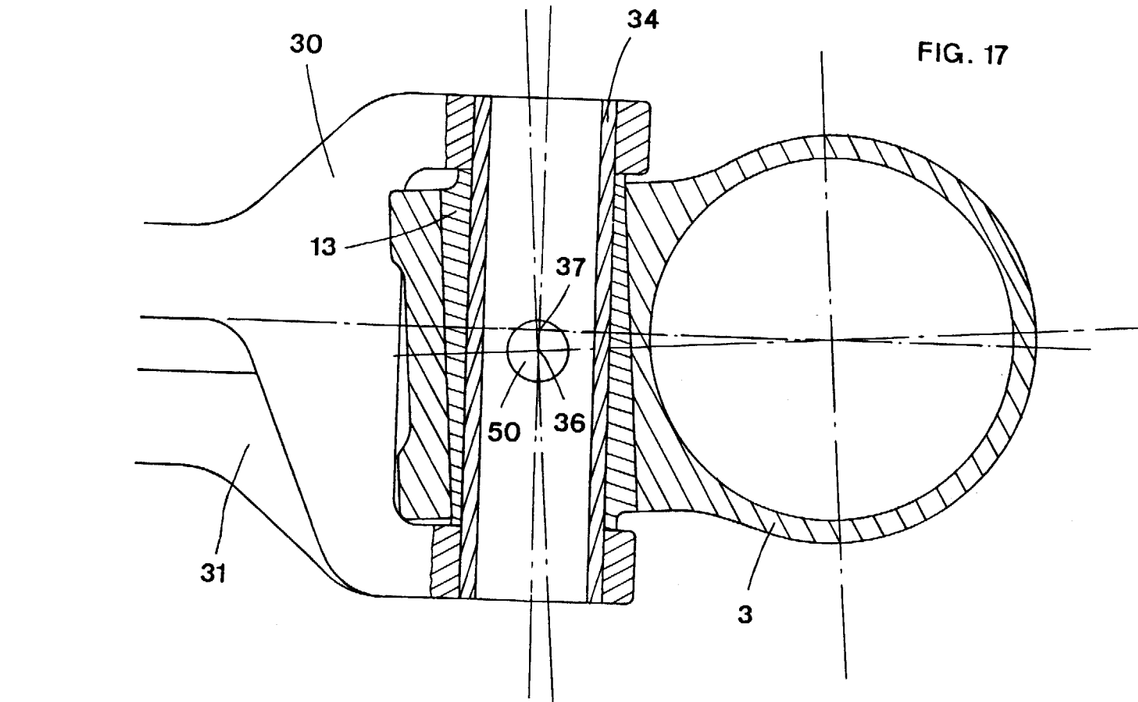
FIG. 17 is a detail view corresponding to FIG. 13.

However, with each upper arm 30 being mounted on one of the undercarriage legs 3 pivotally about an axis which does not intersect the axis of the respective undercarriage leg 3, as best seen in FIG. 17 the centre point 36 of the bush member 13, which is positioned at the point of intersection of the axes of the internal bore of the bush member 13 and the bore in which the bush member 13 is retained, which corresponds to the centre point of the pivot mounting of the caliper-like assembly 29 on the leg 3, is displaced laterally outwardly with respect to the centre point 37 of the pivot mounting of the caliper-like assembly 29 on the rod 5, being pivotal about the axis 35 (see FIGS. 9 and 10). This lateral displacement is compensated at the pivotal mounting of the upper arm 30 of the caliper-like assembly 29 on the lower arm 31, as shown in FIGS. 15 and 16, each upper arm 30 being pivotally connected to the inward side of the corresponding lower arm 31, relative to the aircraft.

By virtue of the planes of symmetry of the arms 30 and 31, each of the caliper-like assemblies 29 on one of the undercarriages may be used on the other undercarriage, after the caliper-like assembly has been opened until it assumes a position which is symmetrical with respect to its starting position, relative to the position in which the arms 30 and 31 are aligned.

This second embodiment therefore also provides totally interchangeable undercarriages.

Figure 18:
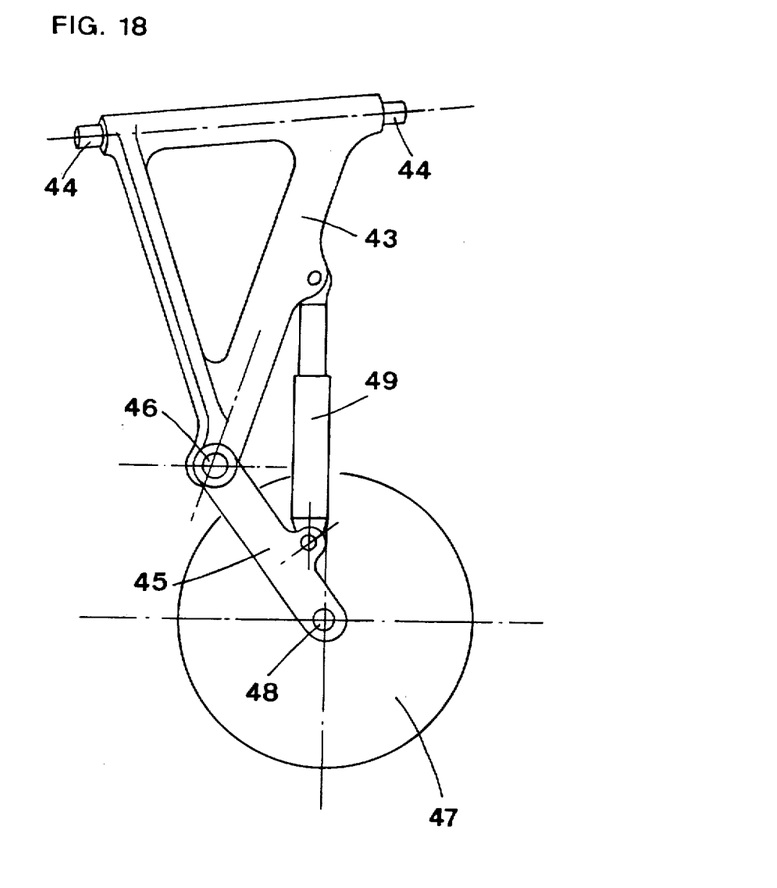
FIG. 18 shows a left-hand undercarriage of a main undercarriage train according to the invention of the "pivoted link" kind, which is retracted substantially laterally, the wheels also being displaced forwardly upon retraction of the undercarriage.

Finally, referring to FIG. 18, the left-hand undercarriage of an undercarriage train of the so-called pivoted link kind, comprises an undercarriage leg 43 the structure of which has a plane of symmetry passing through a pivot mounting axis 44 of the mounting of the undercarriage on the aircraft, the axis 44 in the "undercarriage down" position being disposed in an inclined position identical to the position of the axes 4 of the undercarriages shown in FIGS. 1 to 16, with respect to the plane of symmetry of the aircraft. At the lower end of the undercarriage leg 43, a pivoted link 45 is mounted pivotally about a shaft 46 which passes through a bore, the axis of which is perpendicular to the plane of symmetry of the aircraft, in a bush member which is similar to the above-described bush member 13 and which is retained in a bore the axis of which is perpendicular to the plane of symmetry of the undercarriage leg 3, which bore is provided in the lower end of the undercarriage leg 43. The lower end of a damper 49 is pivotally connected to the pivoting link 45 which carries a wheel 47 is mounted rotatably about an axle 48, while the upper end of the damper 49 is pivotally connected to the leg 43. The angular displacement between the plane of symmetry of the undercarriage leg 43 and the plane of symmetry of the aircraft is thus compensated at the pivotal connection of the pivoted link 45 to the undercarriage leg 43, with the assembly formed by the link 45 and the wheel 47 moving in a plane which is parallel to the plane of symmetry of the aircraft, when the aircraft is moving on the ground.

In the various embodiments described hereinbefore, the shaft can be retained in the internal bore in the bush member and the bush member be itself retained in the bore in which it is received, by means of a single pin 50 which is centered on the intersection of the axes of the two above-mentioned bores, as can be seen from FIG. 17.

It should be noted that the invention is not limited to undercarriage trains in which the undercarriages are disposed in a substantially vertical plane parallel to the longitudinal axis of the aircraft in the "undercarriage down" position, but that the invention is also applicable to undercarriage trains in which the undercarriages are inclined, wherein the means for alignment of the wheels may include cardan joints associated with director bars.

We claim:

1. A main undercarriage train for an aircraft, comprising two undercarriages composed of a left-hand and a right-hand undercarriage each of which are retractable substantially from an "undercarriage down" to an "undercarriage up" position laterally and which are disposed symmetrically on respective sides of said aircraft, said left-hand and said right-hand undercarriages being interchangeable and designated in accordance with its position relative to a longitudinal plane of symmetry of the aircraft, each said undercarriage comprising:

a leg which supports a wheel carrying member carrying at least one wheel, a pivot mounting each of said undercarriage legs on the aircraft, each of said legs being symmetrically inclined along a pivot axis passing through said pivot mounting with respect to said longitudinal plane, and each said wheel carrying member having a wheel support internal bore;

damping means and alignment means associated with each said wheel carrying member for keeping the plane of said at least one wheel parallel to the longitudinal plane of symmetry of the aircraft in the "undercarriage down" position with said leg, said damping means and said wheel-carrying member on each of said undercarriages being identical with each other;

each said undercarriage leg having a plane of symmetry which passes through the pivot axis of said pivot mounting on the aircraft;

each said undercarriage including a bush having an external cylindrical surface portion for retaining said bush in either of two determined positions in said wheel support bore in said wheel-carrying member, said bush having an internal bush bore with the axis of said internal bush bore being perpendicular to said plane of symmetry of said undercarriage leg; and, a shaft passing through said internal bush bore, said alignment means being pivoted on said shaft, the axis of said internal bush bore being off-set with respect to the axis of said wheel support bore in which said bush is retained, thereby to compensate from the angular displacement between the longitudinal plane of symmetry of the aircraft and the inclined pivot mounting axis of said undercarriage leg, one of said two determined positions in which said bush is retained in said wheel support bore being displaced through a certain angle from the other of said two determined positions and the other of said two determined positions being obtained from the one of the positions by rotating said bush through said certain angle about the axis of said internal bush bore, whereby to provide for the interchangeability of said left-hand and right-hand undercarriages.

2. The main undercarriage train according to claim 1, wherein said wheel carrying member includes:

a rod slidably received within said undercarriage leg, said rod having at one end thereof a wheel bore and having its other end cooperating with said leg to form said damping means, and a wheel shaft passing through said wheel bore for support of said at least one wheel.

3. The main undercarriage train according to claim 2, wherein said wheel bore and said internal bush bore are displaced from each other along a longitudinal axis of said leg, with said wheel bore being below said internal bush bore.

4. The main undercarriage train according to claim 1, wherein said wheel carrying member includes:

a rod slidably received within said undercarriage leg, said rod having an end cooperating with said leg to form said damping means, said shaft passing through said wheel support internal bore, and means coupling said at least one wheel to said shaft.

5. The main undercarriage train according to claim 1, wherein said wheel-carrying member includes:

a pivoted link having one end pivotally connected to said bush, an intermediate portion connected with said undercarriage leg by said damping means, and another end including an axle mounting means, said at least one wheel being rotatably coupled to said axle mounting means, whereby the angular displacement between the plane of symmetry of said undercarriage leg and the plane of symmetry of the aircraft is compensated at the pivotal connection of said pivoted link to said undercarriage leg.

6. A main undercarriage train according to claim 1, wherein said wheel-carrying member comprises a rod which carries said at least one wheel at its lower end, said rod including said damping means and being slidably received in said undercarriage leg, said rod including said wheel support internal bore, said alignment means for each said undercarriage comprises a caliper-like assembly having two arms which are pivotally connected together, one of said arms being an upper arm which is pivotally mounted on said undercarriage leg and the other of said arms being a lower arm which is pivotally mounted on said rod, wherein said upper and said lower arms of each of said caliper-like assemblies are respectively identical, each said upper arm being pivoted to said undercarriage leg symmetrically with respect to the plane of symmetry of the leg, and each said lower arm being pivoted to said rod about said shaft, the axis of said lower arm intersects the axis of said rod, and said shaft passes through said internal bush bore, said bush being retained in said wheel support internal bore and the axis of said internal bush bore being perpendicular to the plane of symmetry of the aircraft in the "undercarriage down" position.

7. A main undercarriage train for an aircraft, comprising a left-hand and a right-hand undercarriage which are retractable substantially laterally from an "undercarriage down" to an "undercarriage up" position and which are disposed symmetrically on respective sides of the longitudinal plane of symmetry of the aircraft, each said undercarriage being interchangeable and comprising:

a leg which supports a member carrying at least one wheel, a pivot mounting each of said undercarriage legs on the aircraft on a pivot axis which passes through a plane symmetrically inclined with respect to said longitudinal plane of symmetry of the aircraft, each said leg having an internal leg bore;

damping means and alignment means associated with each said member for keeping the plane of said at least one wheel parallel to the longitudinal plane of symmetry of the aircraft in the "undercarriage down" position with the leg, the damping means and the wheel-carrying member on one of the undercarriages being identical to those of the other undercarriage;

each said undercarriage leg having a plane of symmetry which passes through its said pivot axis of said pivot mounting on the aircraft, and each said undercarriage including a bush having an internal bush bore, said bush being retainable in either of two predetermined positions in said leg bore in the undercarriage leg thereof with the axis of said internal bush bore being perpendicular to said plane of symmetry of said undercarriage leg;

a shaft passing through said internal bush bore, said alignment means being pivoted on said shaft, the axis of said internal bush bore being off-set with respect to the axis of said leg bore in which said bush is retained, thereby to compensate for the angular displacement between the longitudinal plane of symmetry of the aircraft and the inclined pivot mounting axis of said undercarriage leg, one of said two predetermined positions being displaced through a certain angle from the other of said two predetermined positions and the other of said two predetermined positions being obtained from the one of the positions by rotating said bush through said angle about the axis of said internal bush bore, the left-hand and the right-hand undercarriages thus being totally interchangeable.

8. A main undercarriage train according to claim 7, said leg comprising a rod which carries said at least one wheel at its lower end, slidably received in said undercarriage leg;

said damping means including a damping cylinder forming a part of said undercarriage leg;

said alignment means for each said undercarriage comprising a caliper-like assembly having two pairs of arms, each of said pairs of arms including an upper arm which is pivotally mounted on said undercarriage leg and a lower arm which is pivotally mounted on said rod, said upper arms for each said undercarriage being identical with each other, and said lower arms for each said undercarriage being identical with each other, said upper arm and said lower arm of each said pair being pivotally connected together, each of said caliper-like assemblies having a first plane of symmetry which passes through the axis of the pivotal connection of said upper arm and said lower arm of each said pair of arms and the axis of the pivotal mounting of said upper arms on said undercarriage leg and a second plane of symmetry which passes thorough the axis of said pivotal connection and the axis of the pivotal mounting of each of said lower arms on said rod, each said upper arm being pivoted to said undercarriage leg about said shaft, the axis of said shaft in said "undercarriage down" position being perpendicular to the plane of symmetry of the aircraft, said bush being retained in said internal leg bore provided in said undercarriage leg and the axis of said internal leg bore being perpendicular to the plane of symmetry of said undercarriage leg; and, each said lower arm being pivoted to said rod about an axis which in said "undercarriage down" position, is perpendicular to the plane of symmetry of the aircraft, the upper and lower arms of each said caliper-like assembly being pivotally connected together with a displacement which compensates for the lateral displacement between a pivotal connection for the pivotally mounting of said upper arms to said undercarriage leg and a pivotal connection for the pivotally mounting of said lower arms to said rod, in such a way that said caliper-like assembly on one of said undercarriages can be used on the other of said undercarriages, after having been opened until it assumes a position which is symmetrical with respect to its initial position, relative to the position of alignment of the arms.

9. A main undercarriage train according to claim 7, said leg comprising a pivoted link which simultaneously, is included in said alignment means and carries said at least one wheel, said alignment means being pivotally mounted on the lower part of said undercarriage leg;

said alignment means carrying a pivot mounting said damping means for connection thereof to said undercarriage leg, wherein the pivoted link is pivoted about said shaft, the axis of said shaft in the "undercarriage down" position being perpendicular to the plane of symmetry of the aircraft and passing through the internal bore in said bush, said bush being held in said internal leg bore, and the axis of said bush being perpendicular to the plane of symmetry of said undercarriage leg and being held in the lower part of said undercarriage leg.

10. The main undercarriage according to claim 7 wherein said certain angle is 180°, and said bush is rotated through said 180°.

11. A main undercarriage train according to any one of claims 1, 7, 8 or 9, wherein said shaft is retained in said internal bush bore, and including a single pin for retaining said bush in the bore which receives said bush, said single pin being centered on the intersection of the axes of said bush bore and said bush receiving bore.

12. A main undercarriage train according to claim 1 or 2, in which said certain angle is 180°.

13. An undercarriage train for a vehicle, comprising, leg support means including a shaft;

a bush having a cylindrical internal bush bore and a cylindrical outside surface portion, said bush being rotatably mounted on said shaft which is received in said internal bush bore;

a support for at least one wheel, said support having a hollow portion, said cylindrical outside surface portion being rotatably mounted to said support and received in said hollow portion; and said internal bush bore having an axis which is offset with respect to the axis of said cylindrical outside surface portion;

said leg support means including an interchangeable wheel carriage for supporting said shaft, said leg support means having a designated position relative to a longitudinal plane of symmetry of said vehicle;

rotation of said cylindrical outside surface portion through a certain angle permits positioning of said bush in either of two predetermined positions thereby providing for the interchangeability of positions of said interchangeable wheel carriage from one side of said plane of symmetry of said vehicle to the other side thereof, and permitting a change in the orientation of a plane of said wheel relative to a plane of said leg support means.

14. The undercarriage train according to claim 13 wherein
said bush is rotated through an angle of 180°.

15. An undercarriage train according to claim 13, including:
a single pin for retaining said bush in said hollow portion which receives said bush, said single pin being centered on an intersection of the axes of said bush bore and said bush receiving bore for retaining said bush in one of said two predetermined positions such that the two predetermined positions are separated by a certain angle.

* * * * *